Dec. 6, 1960  H. J. FITZGERALD  2,962,874
COOLING TRAY FOR FOOD PRODUCTS AND BEVERAGES
Filed March 30, 1959  3 Sheets-Sheet 1

INVENTOR
HAROLD J. FITZGERALD
BY
ATTORNEY

Dec. 6, 1960   H. J. FITZGERALD   2,962,874
COOLING TRAY FOR FOOD PRODUCTS AND BEVERAGES
Filed March 30, 1959   3 Sheets-Sheet 2
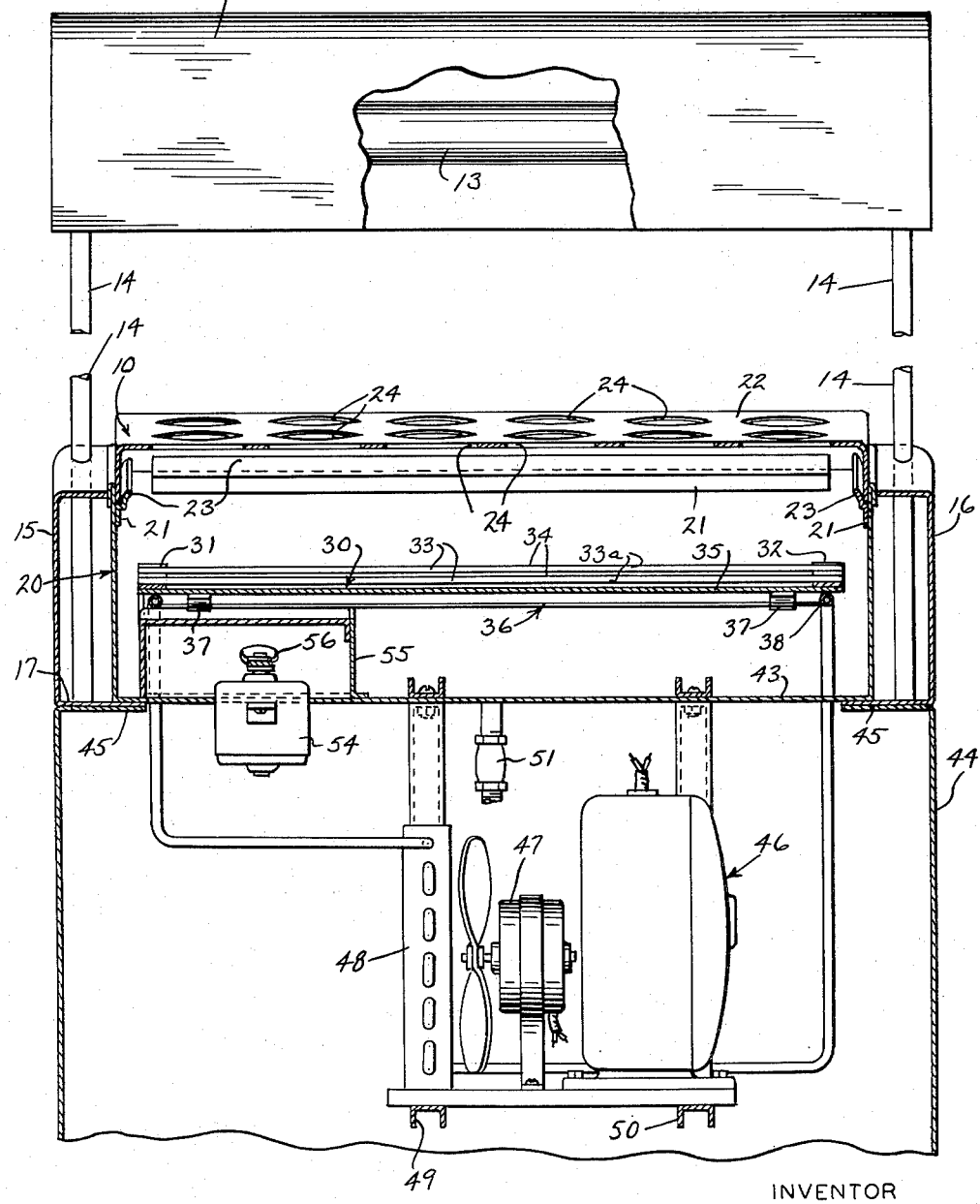
INVENTOR
HAROLD J. FITZGERALD
BY
ATTORNEY

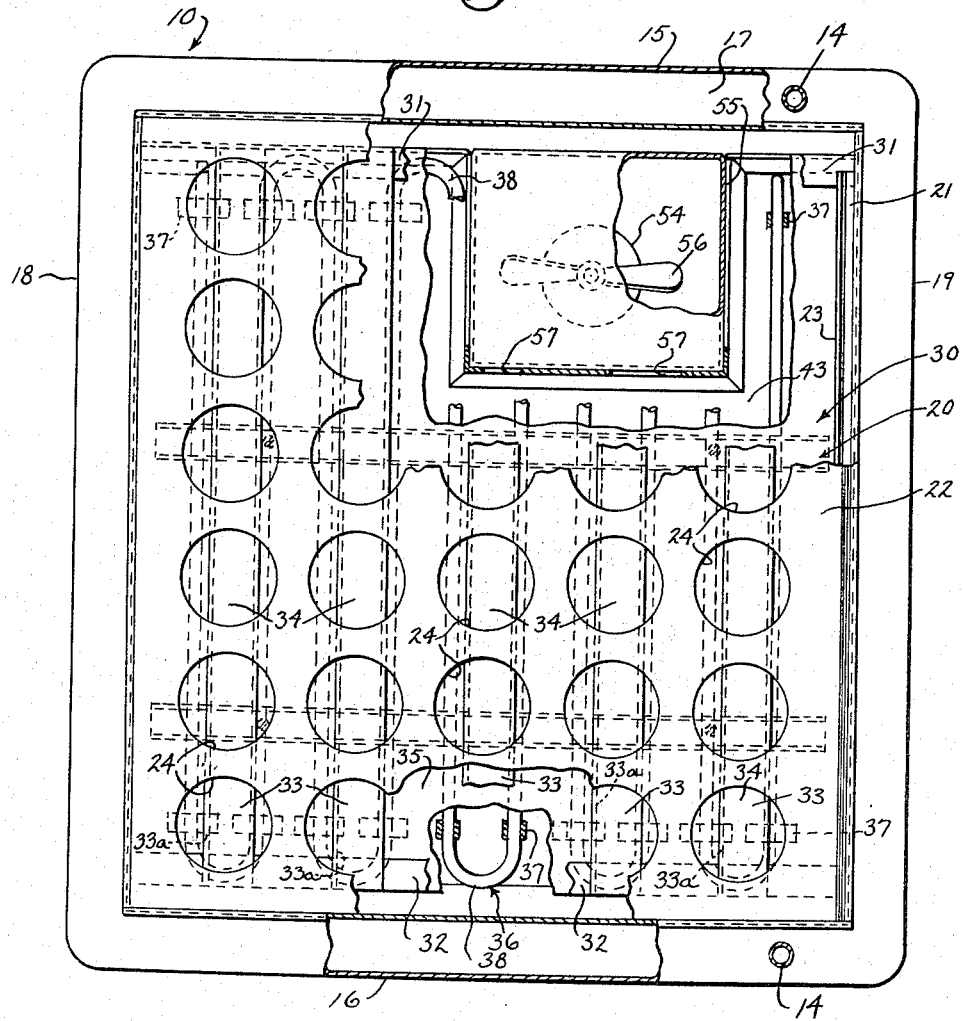
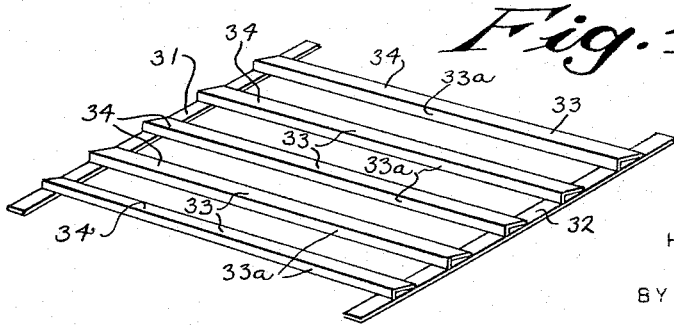

United States Patent Office 2,962,874
Patented Dec. 6, 1960

2,962,874
COOLING TRAY FOR FOOD PRODUCTS AND BEVERAGES

Harold J. Fitzgerald, Whitefish Bay, Wis., assignor to Supurdisplay, Inc., Milwaukee, Wis., a corporation of Wisconsin Filed Mar. 30, 1959, Ser. No. 802,993

2 Claims. (Cl. 62—251)

The present invention relates to food cooling apparatus, and it more particularly resides in a cooling tray for foodstuffs, and particularly beverages, poured into relatively tall containers and assembled in display for self-service, and in which apparatus there is included a stepped supporting base member for the said containers with raised side walls to form a cooling box and a top plate member arranged to receive the said containers through a plurality of apertures therein and to support these containers at points spaced above the said base member, the base member being arranged to be seated in the proximity of laterally spaced portions of a continuous cooling coil, said cooling coil being supplied with a refrigerant from a compressor-pump combination.

The invention finds particular use in cooling or maintaining previously cooled beverages, poured into containers, such as waxed paper containers or plastic containers for immediate consumption after purchase, and in which the beverage may be poured into the containers while they are supported by the apparatus, or which may be previously filled prior to being placed in the apparatus. The apparatus is adapted for convenient self-service, such as during an intermission period in a theater when there is apt to be considerable demand for the beverage within a relatively short period of time, such demand being anticipated by the previous filling of the containers displayed by the apparatus.

It is an object of the present invention to provide a combination beverage and food cooler and display stand suitable for use in self-service installations.

It is another object of the present invention to provide a cooling tray apparatus for supporting a plurality of previously filled beverage containers arranged in tiered display for immediate selection of a desired beverage or food contained therein, and so as not to interfere with separate removal of the containers therefrom.

It is a further object of the present invention to provide a cooling and display tray for food and beverage containers which is readily accessible for cleaning and other maintenance.

It is still another object of the present invention to provide a beverage and food cooling tray and display unit which is compact in nature and which contains a convenient refrigerating unit wherein cooling coils are positioned in the proximity of a base member arranged to support a plurality of beverage or food containers from the bottom of each container, and in which unit a fan member may be disposed immediately below the coils for circulating the descending cooled air, returning the same upwardly to surround the containers in a relatively enclosed housing.

The foregoing and other objects and advantages of this invention appear from the description to follow. In the description reference is made to the accompanying drawings, which form a part hereof, and in which there is shown by way of illustration and not of limitation a specific form in which this invention may be embodied.

In the drawings:

Fig. 2 is a sectional view taken along lines 2—2 of Fig. 1;

Fig. 3 is a view taken along the plane of line 3—3 of Fig. 1, illustrating the unit in plan, and in which portions are broken away to further illustrate detail thereof; and Fig. 4 is a perspective view of the base member, or rack, for supporting containers in the apparatus.

Figure 1:
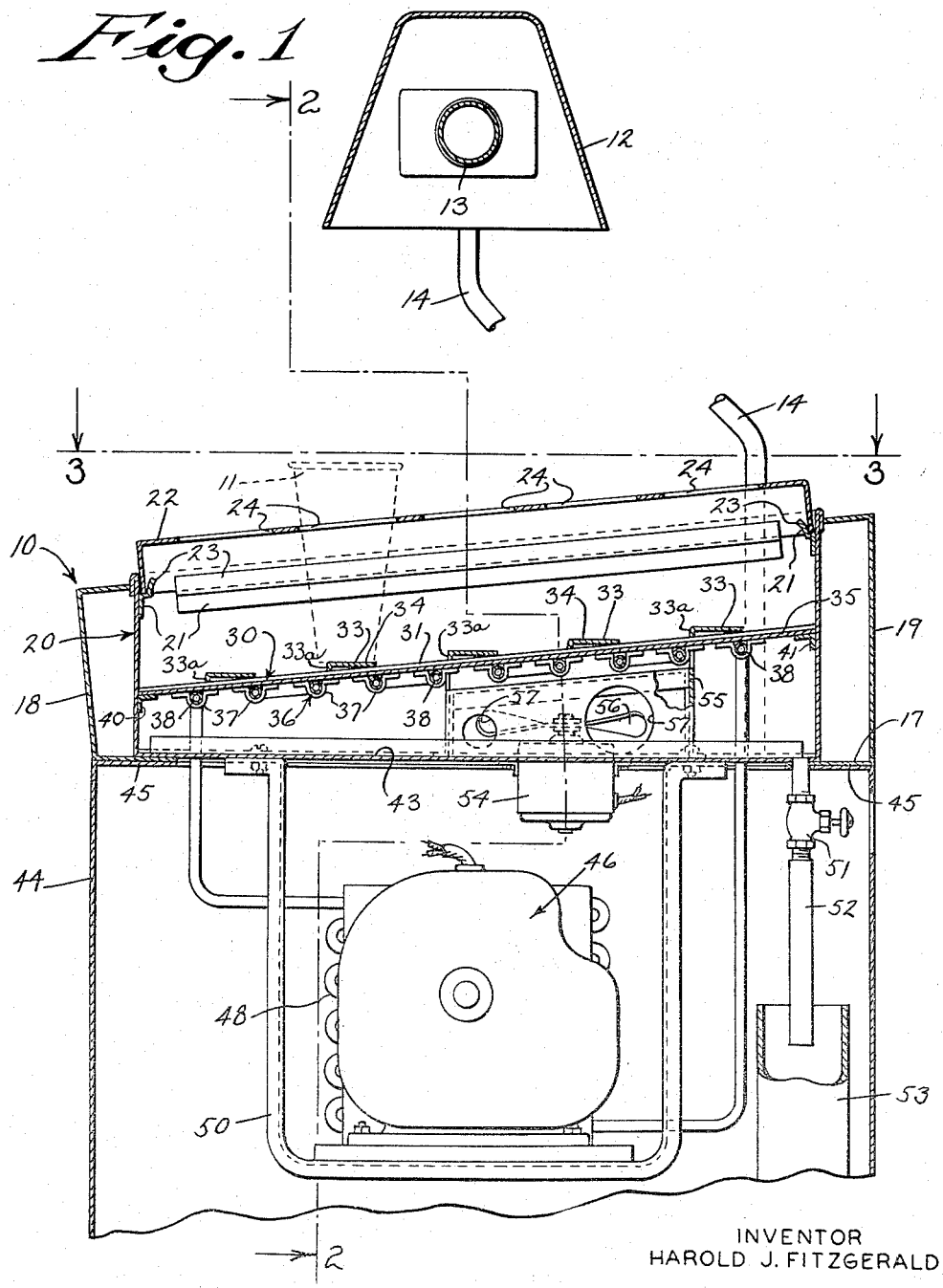
Fig. 1 is a side view in elevation, and in section, of a cooling tray and display unit embodying the present invention.

Referring now to the drawings, the apparatus includes a refrigerated display unit, indicated generally by the reference numeral 10, for the cooling and display of beverage and food containers 11. The unit preferably, for display purposes, utilizes an illuminating light fixture 12, preferably including a conventional fluorescent tube 13 substantially coextensive of the width of the unit. The fixture 12 is preferably supported above the unit by means of spaced tubular arms 14 received by opposed supporting hollow side walls 15 and 16, and resting on the bottom floor 17 of the respective side walls.

The raised side wall portions 15 and 16, as well as the front and rear end wall portions 18 and 19, respectively, are preferably of double-walled construction to provide an insulating "dead air" space surrounding the cooling box, indicated generally by the reference numeral 20. If it is desired, this space may also be filled with additional insulating material (not shown).

The upper edges of the walls 15, 16, 18 and 19, tray supporting means, preferably in the form of spot-welded flange members 21, extend substantially coextensive with each of the side and end walls and preferably arranged to removably support an apertured tray member 22, which may take the general form of an inverted box-like member in which the marginal edges thereof are formed downwardly to be removably seated in each of the respective flange members 21. Each flange member 21 is preferably formed to provide an upwardly extending lip portion 23 inwardly thereof. As stated, the tray 22 includes a plurality of laterally spaced apertures 24 for receiving the containers 11, and providing a lateral support therefor, spaced relatively close to their respective upper mouth portions. The containers 11 preferably are supported at the bottom by a base member 30 in order to take advantage of cooling by conduction when in contact with the relatively cool rack.

The rack-like, container-supporting base member 30 is shown in detail in Fig. 4 and is arranged to provide a bottom support for the cups 11, as shown in Fig. 1. It is preferred that the tray 22 and the base member 30 be disposed at an incline to permit ease in removal of the containers 11, and identification of the rearward rows of containers, should they contain a different food or beverage than those disposed in front rows. The supporting base member 30 includes laterally spaced elongated members 31 and 32 supported from each end wall 18 and 19 and being arranged to support, by means of welding or other securing means, a series of spaced L-shaped channel members 33, each preferably having one flanged leg 33a formed shorter than the other, as shown, to provide a relatively horizontal container-supporting surface 34 when the rack is disposed angularly relative to a horizontal plane as shown in Fig. 1. Each of the container-supporting surfaces 34 is preferably aligned to be in register with the axis of the respective apertures 24 of the tray 22, in most instances where the tray is desired, to provide a supporting base for each container 11.

An inclined pan 35 is provided to mutually support the removable base member 30 and the cooling or refrigerating coil 36. The coil 36 is attached to the pan 35 by means of a plurality of spaced U-shaped brackets 37 welded or otherwise fastened to the bottom of the pan 35, and supporting the various coil undulations 38 at laterally spaced intervals. The pan 35, in turn rests upon flange members 40 and 41 secured to and extending along the inner wall members of the end walls 18 and 19, respectively, (see Fig. 1). The floor 43 of the box-like tray is arranged to be supported by a cabinet member 44 having each of its side walls bent at the upper end thereof to provide an L-shaped support 45 to which the floor 43 may be attached as well as the bottom or floor members 17 of the respective side walls 15 and 16, as shown in Fig. 2.

The cabinet 44 houses a motor-compressor unit, indicated generally by the reference numeral 46, and which is of conventional, well-known construction. The compressor unit 46, as well as the separately mounted cooling fan unit 47, and the radiator or evaporator portion 48 of the cooling coil 36 are each supported by means of spaced U-shaped channel members 48 and 50 fastened to the floor 43 at their respective angularly bent upper ends. The entire operating unit is supported out-of-sight in the cabinet 44, thereby to permit the customer's service tray unit forming the upper part of the cooling box 20 to be the only portion exposed. A drain valve 51, for cleaning and defrosting purposes, also communicates with an opening in the floor 43 and is provided with a flexible portion 52, which may be in the form of a hose to be directed to a sewer drain, or as shown in communication with a drain container 53, which may be emptied as desired.

In order to provide complete circulation of cooling air through the space between the containers 11, an auxiliary fan unit 54 is disposed in a housing structure 55 enclosed for protection of the fan blade 56 from spilled beverages, or dripping condensation from the coil 36 during defrosting and cleaning operations. Side wall openings 57 are provided for circulation of the air to the space existing between the side walls 15, 16, 18 and 19 and the covering provided by the tray 22.

It will be apparent that there has been provided an improved self-service, food and beverage cooling apparatus arranged in a compact manner for ease in maintenance and access by customers desiring to purchase food and beverages contained in easily removable containers from the apertured supporting tray, and in which each container is positioned on a base support member in the proximity of a refrigerating coil, and further wherein the entire surface of the container may be cooled by circulating air currents provided by an auxiliary fan housed in the box-like container.

I claim:

1. A refrigerated display unit comprising an enclosed cooling box portion for a plurality of food containers removably supported therein, said box portion having a bottom, side walls, an apertured top plate for slidably receiving the major portion of said containers therethrough and a supporting base member disposed intermediate said top and bottom and arranged to provide a bottom support for a plurality of food containers resting thereon; a cooling coil unit comprising a series of relatively flat undulations disposed in the proximity of said base member, and a refrigerant supply unit for said coil unit supported from and below said bottom of said box portion; and an auxiliary fan disposed within said box portion and in the proximity of the bottom thereof for circulating cooled air therethrough.

2. A refrigerated display unit comprising an enclosed cooling box portion for a plurality of open food containers removably supported therein, said box portion having a bottom, side walls, a removable top plate having openings therein for slidably receiving the major portion of said containers therethrough and an inclined supporting pan disposed intermediate said top and bottom and providing bottom supports for a plurality of food containers resting thereon; a cooling coil unit comprising a series of relatively flat undulations disposed in the proximity of the underside of said pan; a refrigerant supply unit for said coil unit supported from and below said bottom of said box portion; and an auxiliary fan disposed underneath said pan and in the proximity of the bottom of said box portion for circulating cooled air therethrough.

References Cited in the file of this patent

UNITED STATES PATENTS

| 2,192,746 | Justheim | Mar. 5, 1940 |
| 2,327,631 | Fibus | Aug. 24, 1943 |
| 2,471,581 | Poissant | May 31, 1949 |
| 2,575,796 | Conklin | Nov. 20, 1951 |

FOREIGN PATENTS

| 107,207 | Sweden | Apr. 27, 1943 |
| 747,458 | Great Britain | Apr. 4, 1956 |